UNITED STATES PATENT OFFICE.

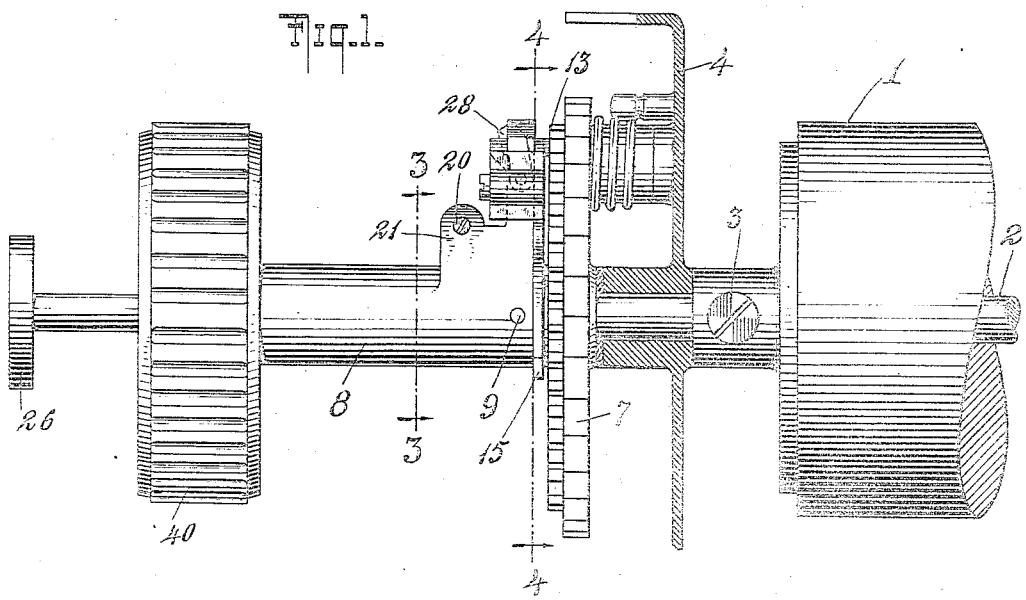
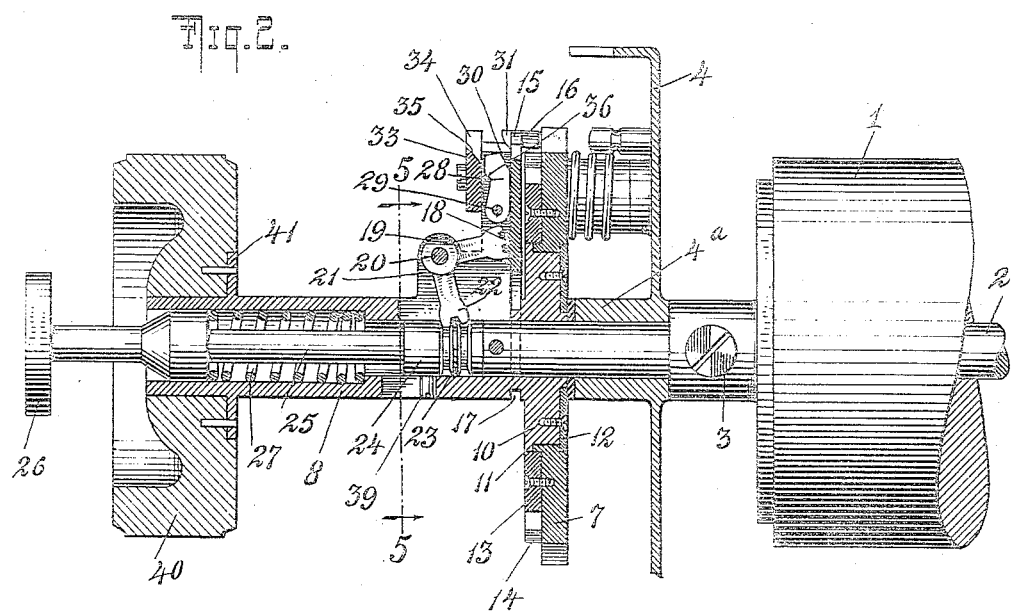

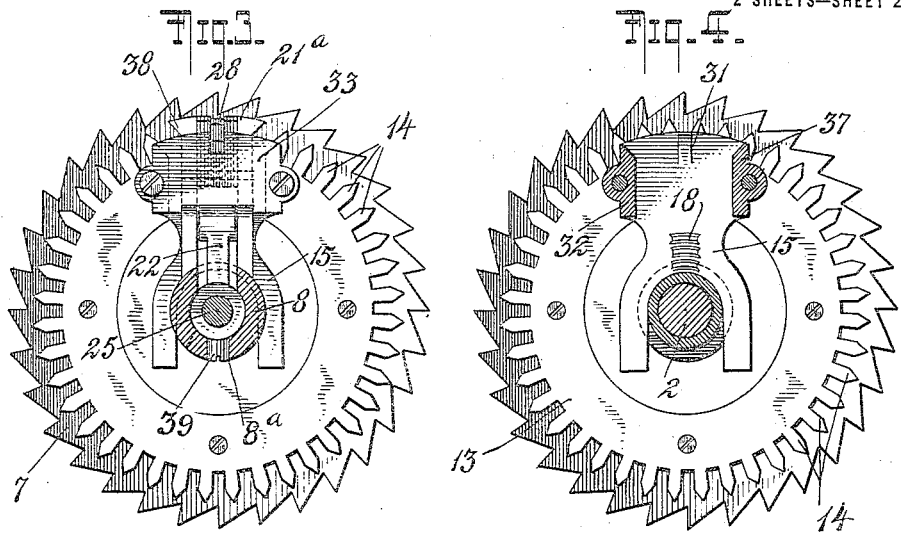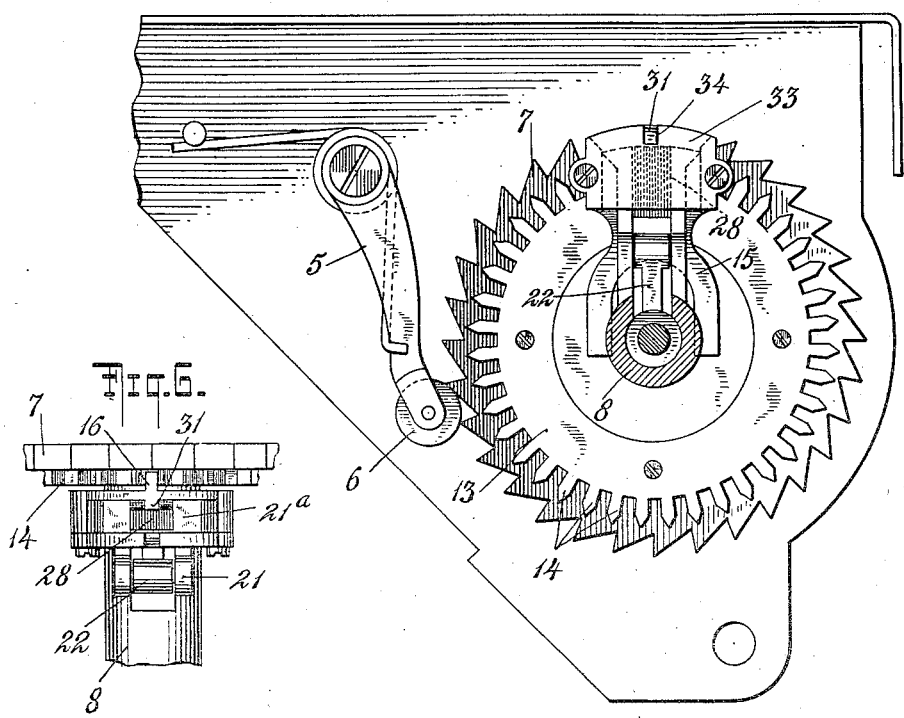

MARQUIS H. LOCKWOOD, OF NEW YORK, N. Y., ASSIGNOR TO UNDERWOOD TYPEWRITER COMPANY, OF NEW YORK, N. Y., A CORPORATION OF DELAWARE.

TYPE-WRITING MACHINE.

1,177,879.  Specification of Letters Patent.  Patented Apr. 4, 1916.

Application filed July 13, 1914. Serial No. 850,595.

*To all whom it may concern:*

Be it known that I, MARQUIS H. LOCKWOOD, a citizen of the United States, and resident of the borough of Manhattan, city, county, and State of New York, have invented certain new and useful Improvements in Type-Writing Machines, of which the following is a specification.

My invention relates to typewriter platen releases or devices adapted to permit the platen to be disconnected from the line space wheel and revolved independently thereof. It is desirable in devices of this character that the two elements or members may be disconnected, one from the other at will and connected together again at any adjusted position of one with respect to the other so that thereafter they may be revolved in unison by means of the usual line space mechanism. Various mechanisms adapted to accomplish these results have been devised, some of which attempt to obtain a positive clutch between the platen and line space wheel while at the same time it has a slight variable movement controlled or locked by a wedging device. Platen releases of this type will be found in the patent of Arthur W. Smith, July 23, 1907, No. 860.834, and in my application Serial No. 783,867, filed August 9, 1913. These devices while clutching positively are found to give or settle under the particularly snappy hammering of the line space lever of machines such as the Underwood typewriting, due to the sliding of the wedge faces, or beveled contact planes upon each other.

The object of my invention is to utilize interlocking clutch members which are mutually adjustable over at least the distance between two adjacent clutch teeth so that the platen and line space wheel may be connected together at any rotative position of one with respect to the other and positively held from any change of such adjustment. To accomplish this I employ any suitable arrangement of displaceable movable elements adapted to engage the adjustable member of the clutch in its adjusted position by displacing a predetermined number of the movable elements while retaining the elements not so displaced in position to act upon the adjustable clutch member tangentially of the circle of movement of the clutch so as to positively prevent circumferential displacement thereof after the clutch is closed.

In the present instance I have illustrated one form of the invention in which I preferably employ for the aforesaid movable elements a plurality of extremely thin (.003 inch to .005 inch thickness) plates or leaves of steel or other suitable sheet metal. The plates or elements are preferably mounted circumferentially or so that the edges are in a plane adjacent to and parallel with the circle of clutch teeth which are arranged concentric of the axis of the platen in the usual or any preferred manner.

The form of the invention hereinafter described is illustrated in the accompanying drawings in which—

Figure 1 is a plan view of the device and part of the platen and platen frame; Fig. 2 is a section in an axial plane of Fig. 1; Fig. 3 is a section transverse of the axis at 3—3 of Fig. 1; Fig. 4 is a section at 4—4 with some of the parts removed; Fig. 5 is an end view of the platen frame and section 5—5 of Fig. 2, and Fig. 6 shows a plan view of Fig. 3 partially broken away.

Referring to the drawings 1 represents a typewriter platen of the usual construction secured to an axle 2 in any suitable manner as by the screw 3. The device is shown in connection with parts of the well known Underwood machine and 4 represents a portion of the end plate of the platen carriage; 5 is the usual spring pressed detent arm carrying a roller 6 adapted to engage the ratchet teeth of the line space wheel 7.

In order to adapt the parts of my device to this form of construction the axle 2 does not pass entirely through the tubular extension 8 which connects the knurled finger wheel with the platen the axle 2 ending just beyond the plane of the line space wheel as indicated in Fig. 2 of the drawings. The outer tubular portion 8 is pinned or secured to the axle at 9. The tubular member 8 is of special construction and has an enlarged circular head 10 which is provided with a flange at 11 and is adapted to receive the annular line space wheel 7, the latter being held in place to revolve thereon by a washer or clamping plate 12 which may be secured to the circular head 10 by screws or other suitable means. The line space wheel preferably, has secured thereto a spur-toothed annular wheel or disk 13, the teeth 14 of which are pointed at the outer ends and substantially radial toward the bottom thereof. The disk 13 and teeth 14 thereof are adapted to serve as one of the clutch members for securing the platen and line space wheel together to revolve in unison. The other member of the clutch comprises two parts, one of which 15 is mounted adjacent to the line space wheel and is provided with a lateral projecting tooth 16 provided with beveled faces on its lower side, while the upper part is of sufficient width to snugly fit between the teeth 14 of the clutch member on the line space wheel. The member 15 is Y-shaped at its lower end and adapted to straddle the tubular member 8 which is grooved at 17 to receive the same and hold it in place adjacent the circular head 10 substantially as indicated in Fig. 2 of the drawings. The outer face of the member 15 is provided with rack teeth at 18, which are adapted to mesh with the segment of a gear 19 pivoted at 20 to a bifurcated ear or lug 21 projecting from one side of the tubular member 8 substantially as indicated in Figs. 1 and 2 of the drawings. The gear 19 is preferably cut away so as to be substantially of bell crank shape, the lower arm 22 of which is adapted to mesh with rack teeth 23 cut in the end 24 of a push rod 25 in the present instance shown as annular in form so that the rod may be turned while the teeth remain in mesh. The rod 25 is provided with a finger piece 26 whereby the rod may be forced inward of the tubular member 8 and thereby lift the tooth 16 out of engagement with the teeth 14 of the circular clutch member 13 on the line space wheel.

When the finger piece 26 is released a spring 27 surrounding the rod 25 and inclosed in an enlarged portion of the bore of the tubular member 8 will force the rod outward and thereby bring the tooth 16 into engagement again with the circular clutch member 13. It will be seen that from the loose construction or mounting of the member 15 in the groove 17 this intermediate clutch member is adapted for a limited circumferential movement so that whether or not the tooth 16 stands directly over the space between two of the teeth 14 when the adjustment of the platen is made the tooth 16 with its beveled faces will strike the bevel faces or outer points of the teeth 14 and thereby be forced circumferentially in one direction or the other and always enter and completely engage between the teeth 14 of the clutch member 13. This construction is desirable in that upon adjusting the platen to the proper line position the relation between the line space wheel and the platen will not always be the same and will not necessarily correspond to the teeth of the clutch members and for this reason the circumferential movement of the member 15 is of importance.

Obviously the amount of movement of the member 15 required should not necessarily exceed the pitch distance between the teeth 14 and after engagement, the member 15 should be rigidly held from any further movement in either direction. For this purpose in the present instance I employ a plurality of movable elements consisting of thin flat plates or leaves 28 which are mounted between outwardly extending arms or portions of the bifurcated lug 21 and are pivoted at 29 substantially as indicated in Fig. 2 of the drawings. These leaves 28 are preferably made of thin sheet steel of say .005 of an inch in thickness. In the device as shown the distance between the outwardly projecting lug arms 21 is .150 of an inch and the space will, therefore, be filled by the insertion of thirty leaves or sheets of steel .005 of an inch thick, since it is desirable that the leaves be packed closely together and not permitted to have any lateral movement.

It will be noted that the leaves 28 are arranged circumferentially or in a plane parallel to the plane of the line space wheel and to the plane of movement of intermediate clutch member 15. The upper ends of the leaves 28 are preferably beveled at 30 and are adapted to be displaced outwardly by means of a beveled tooth 31 carried upon the member 15 and projecting in the opposite direction from the tooth 16 substantially as indicated in Fig. 2 of the drawings. The tooth 31 has parallel sides adapted to enter between the leaves 28; the thickness of the tooth 31 being in the present instance .050 of an inch so that it is adapted to displace or thrust outward ten of the leaves 28. Owing to the circumferential movement of the member 15 the ten leaves may be displaced at the center, if the tooth 16 enters the teeth 14 without any lateral or circumferential movement and at either side of the center if the tooth 16 in entering between the teeth 14 of line space clutch member is displaced to one side or the other of the center. The leaves 28, not displaced by the tooth 31, will remain in normal position and offer a resistance to any further circumferential movement of the member 15 in either direction, the force acting perpendicularly against the side faces of the tooth 31 or tangentially of a circle parallel to the line space wheel.

To insure that only the desired number of leaves 28 shall be displaced by the tooth 31, the member 15 is provided with outwardly extending lugs 32 which are spaced apart a sufficient distance to clear the arms 21ᵃ of the bifurcated lug 21 and allow for slightly more than a tooth space circumferential movement of member 15 as required.

A plate 33 is secured to the lugs 32 parallel to the plane of movement of the member 15 and outside of the arms 21 so that the plates or leaves 28 are inclosed therebetween. The space between the member 15 and the plate 33 is substantially the width of the leaves or elements 28, the plate 33 being provided with a slot 34 directly opposite and of the same width as the tooth 31 whereby when the beveled lower side of the tooth 31 impinges against the beveled faces 30 of ten of the leaves or elements 28 the elements so struck by the tooth 31 will be cammed or displaced outwardly through the slot 34 while the remaining plates will be positively prevented from such movement by the plate 33.

Since the leaves or elements 28 in the present example are not over .005 of an inch thick it will be seen that a very close adjustment between the clutch members can be obtained so that the platen and line space wheel may be united at substantially any rotative position of one with respect to the other and after being thus united there can be no camming action by the clutch members tending to change the adjustment for the leaves 28 act in a tangential or perpendicular direction against the plain faces of the tooth 31.

When it is desired to release the clutch so that the platen may be moved independently of the line space wheel, it is desirable that the member 15 shall be centralized so that its movement may be circumferentially in one direction or the other from the same point or position with relation to the leaves or elements 28 and it is also desirable that such leaves as may have been displaced during the previous engagement may be restored to normal position when the clutch members are released. To accomplish the latter result the slot in the plate 33 is beveled at 35 while the leaves 28 are beveled at 36 so that when the plate 33 is moved upward or outward with member 15, to which it is attached, the bevel face 35 will contact with the bevels 36 of the leaves and restore the displaced leaves to normal position.

The centralizing of the member 15 may be accomplished in any suitable manner, but in the present instance I have beveled the faces of the bracket lugs 32 and 37 and these are adapted to contact with corresponding beveled lugs 38 projecting laterally from the arms 21$^a$, substantially as indicated in Figs. 3 and 4 of the drawings, the distance between the outer extremities of the lugs 28 being equal to the distance between the plain inner faces of the bracket lugs 32 carried by the member 15. It will be observed that the member 15 when released, carries the teeth 16 and 31 to a position considerably above the co-acting members of the clutch so that the tooth 16 clears the outer ends of the teeth 14 and the tooth 31 stands above the beveled edges of the leaves 28 a considerable distance. This arrangement permits the engagement of the beveled faces of the tooth 16 with the corresponding bevels of the teeth 14 during the preliminary engagement or until the member 15 is moved circumferentially in one direction or the other far enough to enter between the straight portions of the teeth 14, at which time the tooth 31 is in position to contact with the beveled ends of the leaves 28 and displace ten of them in the manner previously described.

It is sometimes desirable to hold the clutch disengaged for a period of time and turn the platen independently of the line space wheel, and for this purpose I have provided the head 24 of the rod with a screw or pin 39 which is adapted to reciprocate in a slot 8$^a$ which slot may be enlarged at the inner extremity to form substantially a bayonet slot connection so that when the rod 25 is pushed in it may be slightly turned to bring the screw or pin 39 out of line with the main part of the slot 8$^a$ in which position it will be retained in the bayonet slot until by means of the finger piece 26 the rod is turned in the opposite direction.

The knurled finger piece 40 may be attached to the platen in any suitable manner; in the present instance I have shown an integral flange or collar 41 extending from the tubular member 8 to which the finger wheel 40 may be secured by pins or screws substantially as indicated in Fig. 2 of the drawing.

It will be understood that various modifications of the specific details of construction or arrangement of the essential elements of the invention may be made without departing from the spirit and scope of the accompanying claims.

I claim:

1. In a typewriting machine the combination with a platen having an axle, of a line space wheel revolubly mounted upon said axle, a toothed clutch wheel secured to the line space wheel, and a clutch member comprising a toothed member adapted to revolve with the platen but movable into or out of engagement with said clutch wheel, means connecting said toothed member to the platen and permitting a limited circumferential movement thereof relative to the platen and displaceable members, the faces of which lie parallel to a radial plane through the axle said toothed member being adapted to displace a limited number of the displaceable members those not so displaced being adapted to thrust against said toothed member when the clutch is closed, the line of thrust being in a plane parallel to said line space wheel, thereby preventing circumferential movement of the latter relative to the platen.

2. In a typewriting machine the combination with a platen having an axle, of a line space wheel revolubly mounted upon said axle, a toothed clutch wheel secured to the line space wheel, a clutch member adapted to revolve with the platen comprising a plurality of displaceable elements lying in planes parallel to a radial plane through the axle and a toothed member adapted to engage with said clutch wheel and with a portion of said displaceable elements to lock the platen and line space wheel together at any rotative position of one with respect to the other, the engaging faces of the displaceable elements and said toothed member being at right angles to the plane of the line space wheel.

3. In a typewriting machine the combination with a platen having an axle, of a line space wheel revolubly mounted upon said axle, a toothed clutch wheel secured to the line space wheel, a clutch member adapted to revolve with the platen comprising a plurality of displaceable elements in surface contact and a toothed member adapted to engage with said clutch wheel and simultaneously displace a limited number of said displaceable elements, the elements not so displaced being adapted to lock the platen and line space wheel together at any rotative position of one with respect to the other and means for disengaging said toothed member from the clutch wheel and restoring the displaceable elements to normal position.

4. In a typewriting machine the combination with a platen and line space wheel adapted for rotative movement, one with respect to the other and a clutch for connecting them together to revolve in unison comprising a clutch member having a plurality of teeth secured to the line space wheel and a second clutch member composed of a plurality of movable elements secured to the platen and an intermediate clutching element adapted to enter the clutch teeth of the line space wheel and at the same time displace a predetermined number of said movable elements for closing said clutch, the movable elements not so displaced serving to prevent circumferential displacement of the platen relative to the line space wheel.

5. In a typewriting machine the combination with a platen and line space wheel adapted for rotative movement one with respect to the other, of interlocking clutch members for connecting them together to revolve in unison, one of said clutch members comprising a double toothed member mounted for limited circumferential movement, one of the teeth thereon being adapted to engage the other clutch member, the other tooth being adapted to simultaneously engage means acting tangentially thereon in a plane parallel to said line space wheel, to prevent movement of the latter relative to the platen.

6. In a typewriting machine the combination with a platen and line space wheel adapted for rotative movement one with respect to the other, of interlocking clutch members for connecting them together to revolve in unison, one of said clutch members including an element mounted for limited circumferential movement and adapted to coöperate with and displace a limited number of a plurality of displaceable leaves lying in planes parallel with a radial plane through the axis of revolution, the displaceable leaves not so displaced serving to prevent relative rotation of the platen and line space wheel.

7. In a typewriting machine the combination with a platen and line space wheel adapted for rotative movement, one with respect to the other, a clutch member secured to the line space wheel and a clutch member secured to the platen comprising a plurality of circumferentially arranged pivoted leaves, means for holding said leaves from circumferential displacement, and means adapted to engage the first named clutch member and simultaneously displace a limited number of said leaves, the leaves not so displaced being adapted to prevent relative circumferential movement of the platen and line space wheel.

8. In a typewriting machine the combination with a platen and line space wheel adapted for rotative movement, one with respect to the other, a clutch member secured to the line space wheel and a clutch member secured to the platen comprising a plurality of circumferentially arranged pivoted leaves displaceable in radial planes, means for holding said leaves from circumferential displacement, means coöperating with the first named clutch member and with said leaves to displace a predetermined number thereof, the leaves not so displaced being adapted for preventing relative rotation of the platen and line space wheel and means carried by the last named means for restoring any displaced leaves when the clutch members are disengaged.

9. In a typewriting machine the combination with a platen and line space wheel adapted for rotative movement, one with respect to the other, a clutch member secured to the line space wheel and a clutch member secured to the platen comprising a plurality of circumferentially arranged movable elements displaceable in radial planes and a movable toothed member adapted to engage the clutch member of the line space wheel and to displace a predetermined number of said movable elements, the elements not so displaced being adapted to prevent circumferential movement of said toothed member and thereby lock the platen and line space wheel together to revolve in unison.

10. In a typewriting machine the combination with a platen and line space wheel adapted for rotative movement, one with respect to the other, a clutch member secured to the line space wheel, a clutch member secured to the platen comprising a plurality of circumferentially arranged movable elements displaceable in radial planes and a movable toothed member adapted to engage the clutch member of the line space wheel and to displace a predetermined number of said movable elements, the elements not so displaced being adapted to prevent circumferential movement of said toothed member and thereby lock the platen and line space wheel together to revolve in unison and means for simultaneously disengaging said clutch members and restoring said movable elements to normal position.

11. In a typewriting machine the combination with a platen and line space wheel adapted for rotative movement, one with respect to the other, a clutch member secured to the line space wheel and a clutch member secured to the platen comprising a plurality of displaceable elements and a relatively movable toothed member adapted to engage the clutch member on said line space wheel and to coöperate with said displaceable elements to lock the platen and line space wheel together to revolve in unison.

12. In a typewriting machine the combination with a platen and line space wheel adapted for rotative movement, one with respect to the other, a clutch member secured to the line space wheel, a clutch member secured to the platen comprising a plurality of displaceable elements and a relatively movable toothed member adapted to engage the clutch member on the line space wheel and to coöperate with and displace a fixed member of said displaceable elements to lock the platen and line space wheel together to revolve in unison and means for disengaging said toothed member and said line space wheel clutch member and simultaneously restoring said displaceable elements to normal position.

13. In a typewriting machine the combination with a platen and line space wheel adapted for rotative movement, one with respect to the other, an annular clutch member secured to the line space wheel, and a clutch member secured to the platen comprising a plurality of circumferentially arranged movable leaves and a toothed member, circumferentially movable between said annular clutch and said leaves and provided with a tooth adapted to engage said annular clutch and another tooth adapted to displace a limited number of said leaves when the clutch is closed, whereby the leaves not so displaced are adapted to prevent relative circumferential movement of said clutch members.

14. In a typewriting machine the combination with a platen and line space wheel adapted for rotative movement, one with respect to the other, an annular clutch member secured to the line space wheel, and a clutch member secured to the platen comprising a plurality of circumferentially arranged movable leaves and a toothed member, circumferentially movable between said annular clutch and said leaves and provided with a tooth adapted to engage said annular clutch and another tooth adapted to displace a limited number of said leaves when the clutch is closed, whereby the leaves not so displaced are adapted to prevent relative circumferential movement of said clutch members and means for moving said toothed member to close and open said clutch.

15. In a typewriting machine the combination with a platen and line space wheel adapted for rotative movement, one with respect to the other, an annular clutch member secured to the line space wheel, and a clutch member secured to the platen comprising a plurality of circumferentially arranged movable leaves and a toothed member, circumferentially movable between said annular clutch and said leaves and provided with a tooth adapted to engage said annular clutch and another tooth adapted to displace a limited number of said leaves when the clutch is closed, whereby the leaves not so displaced are adapted to prevent relative circumferential movement of said clutch members, means for moving said toothed member to close and open said clutch and means for centering said toothed member with relation to said plurality of leaves when said clutch is opened.

In testimony whereof, I have hereunto set my hand in the presence of two subscribing witnesses.

MARQUIS H. LOCKWOOD.

Witnesses:
  G. V. RASMUSSEN,
  JOHN A. FERGUSON.